June 17, 1947.  A. E. ANDERSON  2,422,385
ELECTRODE HOLDER
Filed March 30, 1945
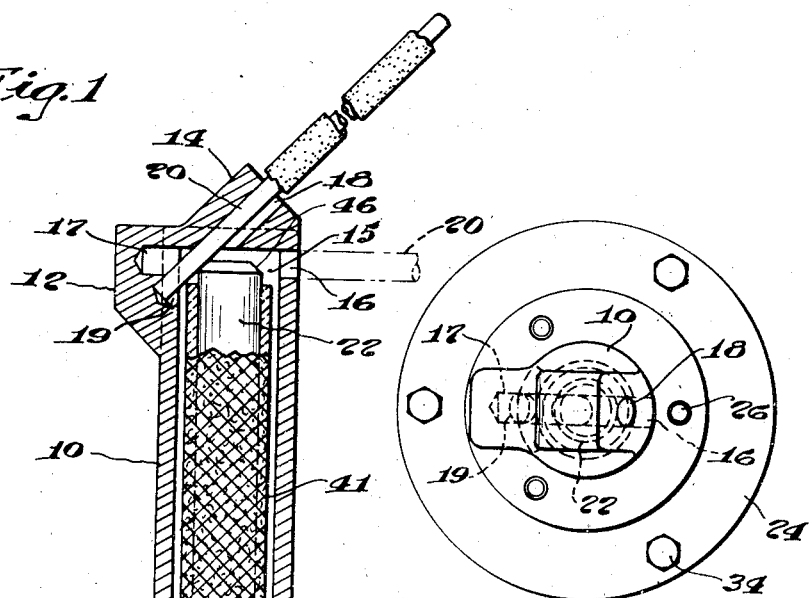
Fig.1
Fig.2
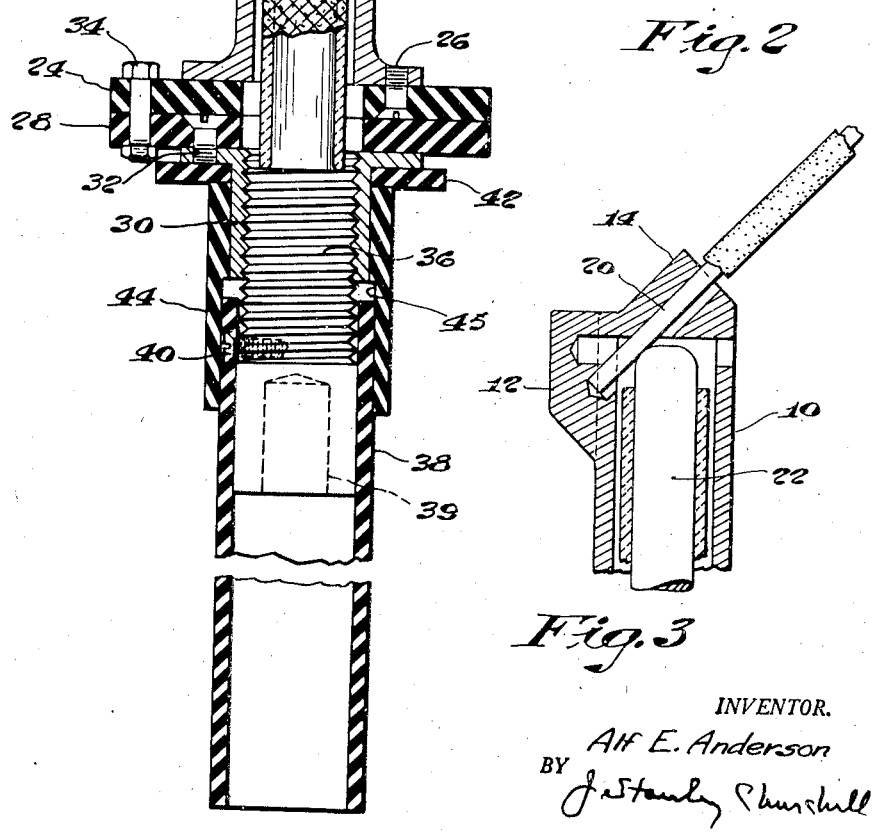
Fig.3
INVENTOR.
Alf E. Anderson
BY
J. Stanley Churchill
ATTORNEY Patented June 17, 1947

2,422,385

UNITED STATES PATENT OFFICE 2,422,385

ELECTRODE HOLDER

Alf E. Anderson, Milton, Mass.

Application March 30, 1945, Serial No. 585,659

5 Claims. (Cl. 219—8)

This invention relates to an electrode holder of the type employed in welding operations.

The invention has for an object to provide a novel and improved high pressure contact electrode holder of the type specified characterized by a structure capable of permitting a welding electrode to be clamped in at least two different angular positions.

With this general object in view and such others as may hereinafter appear, the invention consists in the electrode holder and in the structures arrangements and combinations of parts hereinafter described and particularly defined in the claims at the end of this specification.

In the drawing illustrating the preferred embodiment of the invention, Fig. 1 is a cross sectional view of an electrode holder embodying the present invention; Fig. 2 is a plan view of the same; and Fig. 3 is a detail showing modified form of clamping rod to be referred to.

In the present novel high pressure contact electrode holder provision is made for supporting and clamping the electrode in at least two angular positions, one at right angles to the axis of the holder for performing welding operations at convenient levels such as when the work is disposed on the floor or on a table, and the other at an angle of substantially 45° from the axis of the holder to be used for performing overhead welding operations, thus eliminating the necessity for bending the electrode, and consequently avoiding breakage and damage to the electrode.

Referring now to the drawings, the illustrated electrode holder comprises a tubular metallic cap member or housing 10 having hubs 12, 14 extending angularly from the upper end thereof and in which spaced and aligned pairs of openings 16, 17 and 18, 19 are provided to receive an electrode 20 in either of the two angular positions indicated, and a clamping rod 22 arranged to extend into a central opening 15 in the housing 10 and to cooperate with the walls of the aligned and spaced openings 16, 17 or 18, 19 to clamp the welding electrode in the housing.

As herein shown, the housing 10 is flanged at its lower end and connected to an annular insulating member 24 by screws 26. A second annular insulating member 28 carries a flanged and internally threaded metallic sleeve 30 attached thereto by screws 32 and the annular members 24, 28 are connected together by bolts 34 as illustrated. The clamping rod 22 is provided with a threaded portion 36 arranged to cooperate with the threaded sleeve 30, and, the lower end of the rod is provided with an elongated insulating handle 38 secured thereto by a screw 40. The lower end of the clamping rod 22 is also provided with an opening 39 forming a socket in which may be secured the terminal end of an electric cable, and, the portion of the clamping rod extending into the cap member 10 may be insulated from the sidewalls thereof by a tubular insulating sleeve 41.

The upper end of the clamping rod 22 is shaped so as to engage or bear against the electrode with a substantial bearing area to prevent the electrode being cut off when high pressure is exerted upon the rod 22. Accordingly I prefer to provide a bevel 46 at the upper end of the rod as shown in figure, although in some instances a sufficient bearing area may be obtained by rounding the end of the rod 22 as shown in Fig. 3.

The threaded sleeve 30, as herein illustrated, may be insulated from the operator by an annular insulating collar 42, covering the flanged portion of the threaded sleeve, and, a tubular insulating sleeve 44, the lower end of which is extended beyond the end of the threaded sleeve and provided with an enlarged opening 45 in which the upper end of the insulating handle 38 is telescopically and rotatably received.

From the description thus far it will be observed that in use, when it is desired to clamp the electrode 20 at an angle of approximately 45° from the axis of the holder, as indicated in full lines in Fig. 1, the end of the electrode, from which the outer flux coating has been removed, is inserted into the opening 18 in the angular hub 14, extended diagonally across one corner of the central opening 15 in the cap member, and into a socket 19 formed in the hub portion 12 in alignment with the opening 18 and in which the end of the electrode is seated thus supporting the electrode across the walls of the spaced openings 18, 19. The operator then moves the clamping rod into engagement with the electrode by grasping the holder by the insulating sleeve 44 with one hand and rotating the insulating handle 38 with the other hand to present the beveled end 46 of the clamping rod into engagement with the angularly extended electrode and to urge the latter into high pressure contact with the walls of the spaced opening 18, 19. It will be observed that the bevel 46 corresponds to the angular disposition of the electrode so as to be parallel therewith and to provide adequate contact and clamping area.

When it is desired to clamp the electrode 20 at right angles to the axis of the holder, as indicated in dotted lines in Fig. 1, the electrode is inserted into the opening 16 through the wall of the cap member 10, extended across the upper end of the central opening 15 in the cap member, intersecting the line of the spaced openings 18, 19, and into the aligned socket 17 also formed in the hub 12 and in which the end of the electrode is seated. The clamping rod 22 is then rotated as described to present the flat end of the rod into high pressure contact with the electrode 20 and cooperating with the walls of the spaced openings 16, 17 to firmly clamp the electrode in the holder.

From the above description it will be observed that the present electrode holder is adapted to support an electrode in either of two angular positions with relation to the axis of the holder for the convenience of the operator in performing welding operations at different levels. It will also be observed that the center lines of the angularly disposed and aligned openings 16, 17 and 18, 19 pass through the same plane and intersect in the upper end of the central opening 15 of the cap member or housing and that the walls of each pair of spaced openings form spaced bearing points and provide a three point bearing when the clamping rod 22 is urged against the electrode. It will be further observed that the threaded clamping structure of the present electrode holder permits the electrode to be maintained in high pressure contact with the cap member 10.

While the preferred embodiment of the invention has been herein illustrated and described it will be understood that the invention may be embodied in other forms within the scope of the following claims.

Having thus described the invention, what is claimed is:

1. In an electrode holder, an elongated tubular metallic cap member having at least two hubs extended angularly from the upper end thereof a substantial distance beyond the tubular cap member and provided with spaced and aligned openings for receiving an electrode in at least two angular positions with respect to the axis of said cap member, and a clamping rod extending into said cap member and cooperating with the walls of said spaced and aligned openings to clamp the electrode against the same in selected of said angular positions.

2. In an electrode holder, an elongated metallic cap member having a central opening therein, said cap member being provided with two hubs extended angularly from the upper end thereof a substantial distance beyond the tubular cap member, said hubs being provided with spaced and aligned openings communicating with said central opening for receiving an electrode in either of two angular positions with relation to the axis of the holder, and a screw operated clamping rod extended into said central opening and cooperating with the walls of said spaced and aligned openings to firmly clamp the electrode in either of said angular positions.

3. In an electrode holder, an elongated metallic cap member having a central opening therein and provided with two hubs extended angularly from the upper end thereof a substantial distance beyond the tubular cap member, one hub having an opening communicating with said central opening, the second hub member having a socket formed therein in alignment with the opening in the first hub thus forming a pair of spaced and aligned openings in the holder for receiving an electrode in one angular position with relation to the axis of the holder, a wall opening adjacent the upper end of the cap member also communicating with said central opening and a second socket formed in said second hub in alignment with said wall opening thus forming a second pair of spaced and aligned openings for receiving the electrode in another angular position with relation to the axis of the holder, and a screw operated clamping rod extended into said central opening and cooperating with the walls of said spaced and aligned openings to firmly clamp the electrode in either of said angular positions.

4. In an electrode holder, an elongated metallic cap member having a central opening therein and provided with two hubs extended angularly from the upper end thereof a substantial distance beyond the tubular cap member, one hub having an opening communicating with said central opening; the second hub having a socket formed therein in alignment with said first hub opening thus forming a pair of spaced and aligned openings in the holder for receiving an electrode in one angular position with relation to the axis of the holder, a wall opening adjacent the upper end of the cap member also communicating with said central opening, said second hub having a second socket formed therein in alignment with said wall opening forming a second pair of spaced and aligned openings for receiving the electrode in another angular position with relation to the axis of the holder, and a screw operated clamping rod having engaging surfaces parallel to the different angular positions of the electrode extending into said central opening and cooperating with the walls of said spaced and aligned openings to clamp the electrode in high pressure contact in either of said angular positions.

5. In an electrode holder, an elongated metallic cap member having a central opening therein and provided with two hubs extended angularly from the upper end thereof a substantial distance beyond the tubular cap member, one hub having an opening communicating with said central opening; the second hub having a socket formed therein in alignment with said first hub opening thus forming a pair of spaced and aligned openings in the holder for receiving an electrode in one angular position with relation to the axis of the holder, a wall opening adjacent the upper end of the cap member also communicating with said central opening, said second hub having a second socket formed therein in alignment with said wall opening forming a second pair of spaced and aligned openings for receiving the electrode in another angular position with relation to the axis of the holder, and a screw operated clamping rod having a surface shaped to provide a bearing area of substantial size for engaging the electrode to clamp it in high pressure contact against the walls of said openings.

ALF E. ANDERSON.

REFERENCES CITED

The following references are of record in the file of this patent:

UNITED STATES PATENTS

| Number | Name | Date |
| --- | --- | --- |
| 1,348,530 | Willard | Aug. 3, 1920 |
| 2,233,618 | Leach | Mar. 4, 1941 |
| 2,294,033 | Hooper et al. | Aug. 25, 1942 |
| 2,343,799 | Radabaugh | Mar. 7, 1944 |
| 2,372,009 | Raymond | Mar. 20, 1945 |
| 1,561,055 | Callahan | Nov. 10, 1925 |
| 2,283,996 | Irwin et al. | May 26, 1942 |